UNITED STATES PATENT OFFICE.

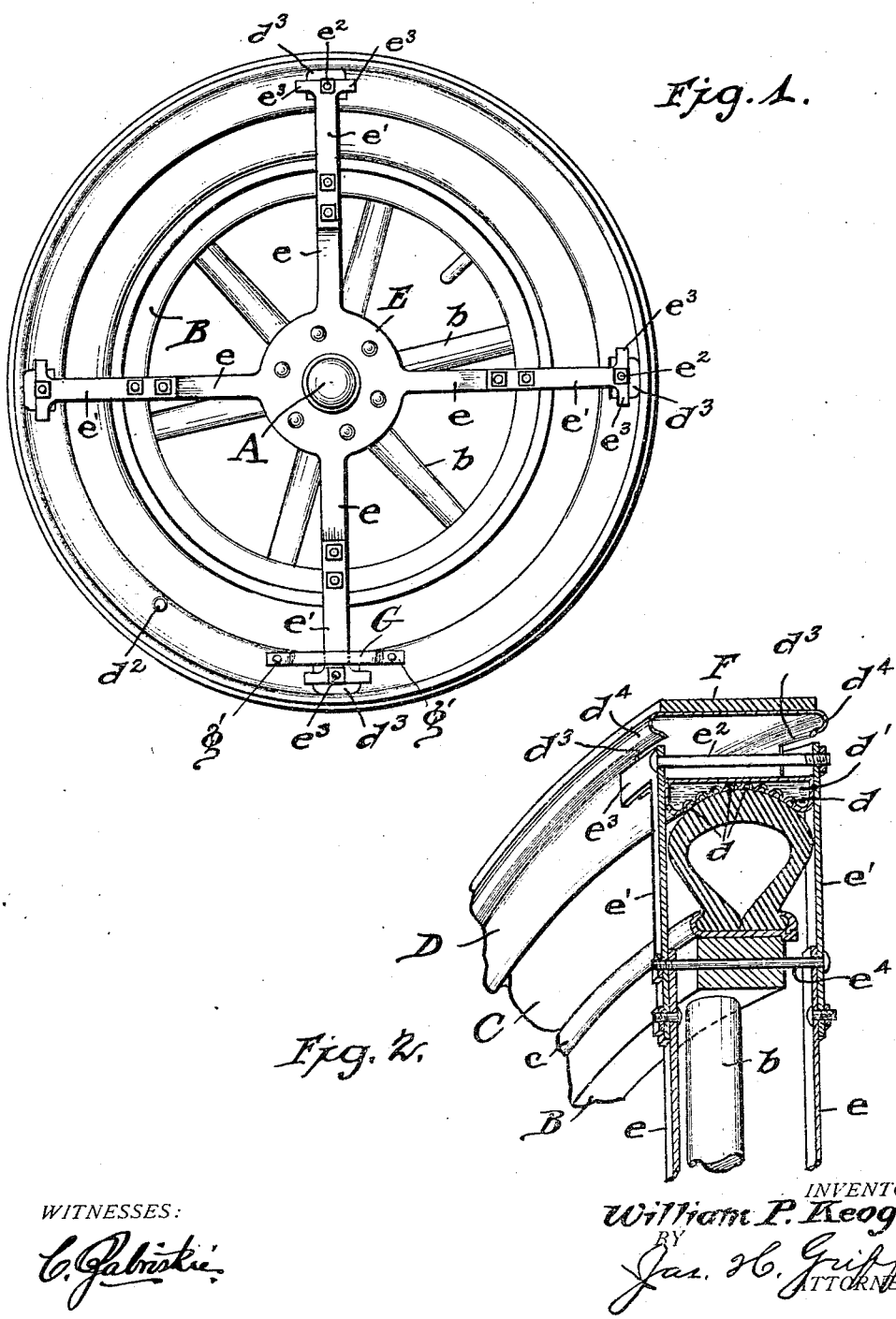

WILLIAM P. KEOGH, OF BROOKLYN, NEW YORK.

VEHICLE-WHEEL.

1,281,979.

Specification of Letters Patent.

Patented Oct. 15, 1918.

Application filed October 7, 1916. Serial No. 124,242.

*To all whom it may concern:*

Be it known that I, WILLIAM P. KEOGH, a citizen of the United States, residing in the city of New York, borough of Brooklyn, county of Kings, and State of New York, have invented certain new and useful Improvements in Vehicle-Wheels, of which the following is a specification.

This invention is a vehicle wheel and more particularly a wheel for automobile pleasure cars and trucks. The object of the invention is to provide a wheel of this class which will possess all of the easy riding qualities of a pneumatic tired wheel but wherein means are provided which will absolutely preclude the puncturing or blowing out of the tire.

With the foregoing object in mind the invention, in one of its practical forms, embodies the usual hub, spokes and felly on which is mounted a pneumatic tire and over the pneumatic tire is positioned an annular casing of metal which forms the ground engaging member of the wheel. The metallic member is preferably provided on its tread surface with a facing of rubber, fiber or other suitable material, the parts being so organized that the pneumatic portion of the wheel never comes in engagement with the road but simply serves as a cushion between the metallic tread member and the axle so that shocks, vibrations and jars received by said tread member are taken up or disbursed by the pneumatic portion of the wheel. All of the benefits of the ordinary pneumatic tire are thus derived from a wheel of the present invention but the pneumatic portion of the wheel is not susceptible to punctures or blow-outs which experience has shown to be a universal disadvantage in pneumatic tired wheels as heretofore constructed.

Features of the invention other than those specified will be apparent from the foregoing description when read in conjunction with the accompanying drawings.

In the accompanying drawings I have illustrated one practical embodiment of the invention but the structure therein shown is to be understood as illustrative only and not as defining the limits of the invention.

Figure 1 is an elevation of a wheel constructed in accordance with the present invention.

Fig. 2 is a section perspective of a fragment of said wheel.

Referring to the drawings, A indicates the hub of a wheel which is also provided with a felly B and supporting spokes $b$. Mounted on the felly B is a suitable form of felly band $c$ adapted to sustain a pneumatic tire C in its usual position upon the wheel. Tire C is preferably of the usual type embodying a shoe and inner tube but, in accordance with this invention, may be made considerably smaller than has been generally the case because of the fact that it is not subjected to ground wear.

Peripherally embracing tire C is a tread member D in the form of an annular casing, that portion of said casing which engages with the tire being of arcuate cross-section whereby it corresponds with the cross-sectional configuration of said tire.

Casing D is in the form of a continuous annulus and is made of such size that, when the tire is positioned therein and the inner tube inflated, the tire will bind tightly against the inner periphery of said annular member and grip the same in frictional engagement so as to preclude relative circumferential movement between the parts. To further preclude such movement that portion of the member D which engages with the tire is provided with a large number of cup-shaped indentations $d$, as shown in Fig. 2, and these indentations or pockets serve as vacuum cups, with the result that, as the wheel moves along the ground, a vacuum is produced in said indentations which serves to more tightly maintain the tire in frictional contact with annular member D.

As more or less heat may be generated by slight movement between the tire and the member D, occasioned by the considerable friction therebetween, the annular casing D may, if desired, be provided with an annular partition extending entirely around the interior of the casing and dividing the casing into two annular chambers. In the chamber $d'$ adjacent the inner periphery of member D may be contained a cooling liquid such as water or other desired cooling substance which may be introduced into said chamber through any suitable form of valve or inlet such as $d^2$, as shown in Fig. 1. The circulation of such liquid through the chamber $d'$ and in engagement with the surface thereof which is in contact with the tire will serve to maintain said surface cool at all times and thereby preclude overheating due to friction as described.

In order to properly maintain the casing D in position at all times, and more particularly when the pneumatic pressure on the tire is decreased below the standard, the hub-plates E of the wheel are provided with sub-radially extending arms $e$ which extend substantially to the outer periphery of the felly of the wheel. Each arm $e$ has bolted to its free end an extension portion $e'$ which projects radially of the wheel and into juxtaposition with the casing D. Both sides of the wheel are formed alike and the free ends of the extension portions $e'$, on the opposite sides of the wheel, are connected by bolts $e^2$ which pass through apertures $d^3$ formed in the member D as clearly shown. The apertures $d^3$ are made sufficiently large to allow of slight movement of the casing D relative to the bolts $e^2$ which movement is particularly occasioned by the compression of the tire C by the casing D as the wheel passes over the road-way. Each extension portion $e'$ is, moreover, provided at its outer end with laterally projecting fingers $e^3$ of such length as to bridge the openings $d^3$ at all times and form a bearing between the extension portion $e'$ and the lateral faces of the casing D.

To protect the extension $e'$ and bolts $e^2$ from disfiguration or abrasion when the wheel is running too close to the curb, car-track or other obstruction the outer periphery of casing D is preferably provided with lateral flanges or beads $d^4$ of sufficient extent to overhang such projection portions and protect the same. In order to stiffen the construction one of the bolts $e^4$, by which each pair of oppositely positioned arms and extension portions $e'$ are secured together, is preferably passed through a bolt-hole in the felly as shown in Fig. 2.

Although not essential I preferably provide the tread surface of the annular tread casing D with a covering F of suitable material such as rubber, fiber or the like which not only protects the casing against sudden jar but also renders its passage over uneven pavements noiseless. This covering F may be secured to the periphery of the casing D in any suitable manner and, if desired, the peripheral wall or walls of said casing may be made of thicker material or reinforced. Moreover, the lateral walls of the casing may be skeletonized or provided with cut-out portions so as to lighten the construction or render it more aesthetic.

Further slight changes may be made in adapting the invention to its various environments in use on trucks or pleasure cars and it will therefore be understood that the present invention is not limited to the specic details shown and discribed but is as broadly novel as is commensurate with the appended claims.

It will be manifest from the foregoing description that because of the protective casing D the tire C does not, at any time, come into contact with the road and, accordingly, cannot sustain punctures or blow-outs which so commonly occur in pneumatic tires as generally employed. Moreover, that because of the decreased wear imposed upon the tire by the construction of this invention said tire may be of considerably smaller dimensions and weight than has been generally necessary. Furthermore, as the weight between the tire and tread casing D is distributed through a substantial angular distance, and not at substantially one point as has heretofore been the case, the number of spokes required as well as the complete general structure of the wheel may be lessened in weight and strength without in the least detracting from its adaptability to sustain the usual loads.

As punctures and blow-outs are practically impossible with wheels of this invention the necessity for frequent changes of the tire is obviated but when such changes are required, as for initial installation, the parts may be assembled by simply removing the bolts which connect the arms $e$ and their extensions $e'$, thereafter positioning the tire and shoe in place relative to the casing D as a unit upon the felly in the usual way and finally securing the extensions $e'$ to their respective arms.

In pneumatic tired autotmobile wheels as now employed, a sudden stopping or starting of the vehicle causes the tire to grip the roadway for the purpose of obtaining the traction to stop or start the vehicle. This sudden stopping or starting of the tire relative to the stationary roadway places a considerable strain on the tire at that particular point which engages with the road, thereby causing said tire to be burned or strained at such particular point. This, manifestly, cannot occur in the wheel of the present invention, since the tire does not engage with the roadway, and, moreover, the strain occasioned by such stopping or starting is distributed throughout the entire circumference of the tire.

In addition to the structure hereinbefore described, the wheel may, if desired, be provided with means for further protecting and guiding the movements of the free ends of the extensions $e'$. In the wheel as shown in Fig. 1, I have illustrated this means in the form of a keeper G, wich embodies a strap riveted or otherwise secured at its opposite ends $g'$ to the lateral walls of the casing D, and near their inner periphery. The strap is off-set intermediate its ends to overlie the extension $e'$ and thus guide, protect, and maintain it in proper position during its operations. It will be understood that, when this means is employed, a keeper G coöperates with each extension $e'$, only one of such keepers being shown in the drawing, in the interest of clearness.

Having thus fully described the invention, what I claim as new, and desire to secure by Letters Patent, is:

1. A vehicle wheel embodying a hub, a felly, spokes for rigidly securing the hub centrally of the felly, and a pneumatic tire on the felly, in combination with an annular, liquid-tight casing positioned circumferentially of the tire, radial arms secured to the hub and to the casing for maintaining said casing against inadvertent displacement, and a liquid housed within the casing for keeping down the heat generated by friction between the tire and the casing.

2. A vehicle wheel embodying a hub, a felly, spokes for rigidly securing the hub centrally of the felly, and a resilient tire on the felly, in combination with an annular water holding casing positioned circumferentially of the tire, said casing having a circumferential partition concentric with the tire, whereby the casing is divided into two annular chambers, and direct connections between the hub and casing for securing said casing in position.

3. An attachment for standard automobile wheels, embodying an annular casing adapted to encircle the tire of a wheel, means for securing the casing directly to the hub of the wheel, and a liquid within the casing for precluding overheating of the tire due to its friction with the casing.

4. An attachment for standard automobile wheels, embodying an annular, metallic, liquid-tight casing adapted to encircle a tire of a wheel, and a liquid within the casing for precluding overheating of the tire due to its friction with the casing.

5. An attachment for standard automobile pneumatic tires embodying an annular metallic casing adapted to tightly circumferentially embrace a tire, that portion of the casing which engages with the tire being of arcuate cross-section to substantially conform to the tread surface of the tire, the tire engaging surface of the casing being provided with suction depressions to increase the frictional engagement between the tire and the casing and a cooling liquid within the casing for carrying off the heat generated by the friction between the tire and the casing.

In testimony whereof I have signed my name to this specification.

WILLIAM P. KEOGH.

Copies of this patent may be obtained for five cents each, by addressing the "Commissioner of Patents, Washington, D. C."